（12）United States Patent
Cheng et al.

(10) Patent No.: US 10,252,871 B2
(45) Date of Patent: Apr. 9, 2019

(54) TRANSMISSION ASSEMBLY AND OFFICE MACHINE USING THE SAME

(71) Applicant: Avision Inc., Hsinchu (TW)

(72) Inventors: Sung-Po Cheng, Hsinchu (TW);
Chin-Chu Chiu, Hsinchu (TW);
Chi-Yao Chen, Hsinchu (TW);
Shao-Lan Sheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/211,080

(22) Filed: Jul. 15, 2016

(65) Prior Publication Data

US 2017/0043969 A1 Feb. 16, 2017

(30) Foreign Application Priority Data

Aug. 11, 2015 (TW) .............................. 104126028 A (51) Int. Cl.
| | |
|---|---|
| *B65H 3/04* | (2006.01) |
| *B65H 5/02* | (2006.01) |
| *B65H 5/06* | (2006.01) |
| *B65H 3/06* | (2006.01) |
| *F16H 7/02* | (2006.01) |

(52) U.S. Cl.
CPC .............. *B65H 3/042* (2013.01); *B65H 3/06* (2013.01); *B65H 3/063* (2013.01); *B65H 3/0669* (2013.01); *B65H 3/0676* (2013.01); *B65H 5/021* (2013.01); *B65H 5/06* (2013.01); *F16H 7/02* (2013.01); *B65H 2404/242* (2013.01); *B65H 2404/2693* (2013.01); *B65H 2511/13* (2013.01); *B65H 2801/06* (2013.01)

(58) Field of Classification Search
CPC .......... B65H 3/042; B65H 3/04; B65H 3/063; B65H 3/0676; B65H 3/06; B65H 3/0669; B65H 3/5223; B65H 3/5238
See application file for complete search history.

(56) References Cited

U.S. PATENT DOCUMENTS

| | | | |
|---|---|---|---|
| 3,966,189 A * | 6/1976 | Taylor | ................... B65H 3/5223 |
| | | | 271/167 |
| 3,970,298 A * | 7/1976 | Irvine | ................... B65H 3/045 |
| | | | 271/122 |

(Continued)

FOREIGN PATENT DOCUMENTS

| | | |
|---|---|---|
| CN | 1590259 A | 3/2005 |
| TW | 201416240 A | 10/2012 |
| TW | M469189 U | 1/2014 |

*Primary Examiner* — Jeremy R Severson (57) ABSTRACT

The present disclosure provides a transmission assembly and an office machine comprising the same. The transmission assembly includes a body, a first roller, a second roller, a flexible element, a third roller and a transmission element. The first roller is pivoted at a first position of the body, the second roller is pivoted at a second position of the body, one end of the flexible element connects to the body, the third roller is pivoted besides the first roller in parallel and rotates with the first roller simultaneously, and a transmission element is used to surround axes of the first roller and the second roller; wherein, the rotating directions of the first roller, the second roller, the third roller and the transmission element are the same. The present disclosure provides another office machine using the same.

9 Claims, 6 Drawing Sheets

(56) References Cited

U.S. PATENT DOCUMENTS

| | | | | |
|---|---|---|---|---|
| 4,909,499 | A * | 3/1990 | O'Brien | B65H 3/5292 |
| | | | | 271/10.06 |
| 5,238,236 | A * | 8/1993 | Belec | B65H 3/04 |
| | | | | 271/122 |
| 7,703,769 | B2 * | 4/2010 | Schwarzbauer | B65H 3/04 |
| | | | | 271/275 |
| 8,452,224 | B2 * | 5/2013 | Ishioka | B65H 5/062 |
| | | | | 399/16 |
| 9,079,730 | B2 * | 7/2015 | Helmlinger | B65H 3/047 |
| 2003/0057638 | A1 * | 3/2003 | Nakamura | B65H 29/34 |
| | | | | 271/264 |
| 2013/0292895 | A1 * | 11/2013 | Ito | B65H 1/06 |
| | | | | 271/35 |
| 2014/0008858 | A1 * | 1/2014 | Sakoguchi | B65H 3/063 |
| | | | | 271/3.18 |
| 2016/0114991 | A1 * | 4/2016 | Cheng | B65H 3/0669 |
| | | | | 271/10.05 |

* cited by examiner

TRANSMISSION ASSEMBLY AND OFFICE MACHINE USING THE SAME

The current application claims a foreign priority to application number 104126028 filed on Aug. 11, 2015 in Taiwan.

BACKGROUND OF THE INVENTION

Field of the Invention

The present disclosure relates to a transmission assembly and a office machine using the same, and more particularly, the present disclosure relates to a transmission assembly and a office machine using the same for transferring a data carrier.

Description of Related Art

Conventional multi-function machines, such as a scanner, a copier, or other office machine with multi-functions, have an automatic feeding device (or named as automatic document feeder, ADF) for a user to add plural sheets without manual operation sheet by sheet.

However, the office machine also can feed the thicker or the harder data carriers except general papers. The thicker or harder data carriers are, for example, postcards, cards, or credentials. Due to the inconsistent thicknesses of the thicker and the harder data carriers, the feeding process of the ADF is not matching various demands of thicknesses. In order to working with the material and performance differences of the data carriers, the feeding mechanism of the ADF needs to be adjusted for processing the general papers and the thicker or harder data carriers. Users need to have a suitable feeding process of the ADF without the trouble of paper jams when any type of papers or cards is feeding.

SUMMARY OF THE INVENTION

Accordingly, an object of the present disclosure is to provide a transmission assembly with function of transferring a data carrier and a office machine using the same, and ensures the transferring process of the data carrier smoothly.

To achieve the foregoing and other objects, a transmission assembly is provided, which can transfer a data carrier along a transferring path. The transmission assembly includes a body, a first roller, a second roller, a flexible element, a third roller, and a transmission element. The first roller is pivoted in a first position of the body, and the second roller is pivoted in a second position of the body. In addition, one end of the flexible element is suitable for connecting to the body. The third roller is disposed in the transferring path. The transmission element is connected to the first roller and the second roller along the transferring path. Wherein, the transmission element drives the data carrier to transfer along the transferring path, and the rotating directions of the first roller, the second roller, the third roller, and the transmission element are the same.

To achieve the foregoing and other objects, a office machine is further provided. The office machine includes a data carrier transferring channel and a transmission assembly. The transmission assembly is disposed in the data carrier transferring channel, and transfers a data carrier along a transferring path. The transmission assembly is regulated flexibly to adjust the height of the data carrier transferring channel according to the thickness of the data carrier. Besides, the transmission assembly includes a body, a first roller, a second roller, a flexible element, a third roller, and a transmission element. The first roller is pivoted in a first position of the body, and the second roller is pivoted in a second position of the body. One end of the flexible element is suitable for connecting to the body, and the third roller is disposed in the transferring path. The transmission element is connected to the first roller and the second roller along the transferring path. The office machine further includes a fourth roller and a friction element. The fourth roller is disposed in the transferring path, and the friction element is disposed in the data carrier transferring channel and disposed opposite to the fourth roller. wherein, the transmission element drive the data carrier to transfer along the transferring path, and the rotating directions of the first roller, the second roller, the third roller and the transmission element are the same.

BRIEF DESCRIPTION OF THE DRAWINGS

The detailed structure, operating principle and effects of the present disclosure will now be described in more details hereinafter with reference to the accompanying drawings that show various embodiments of the disclosure as follows.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1A:
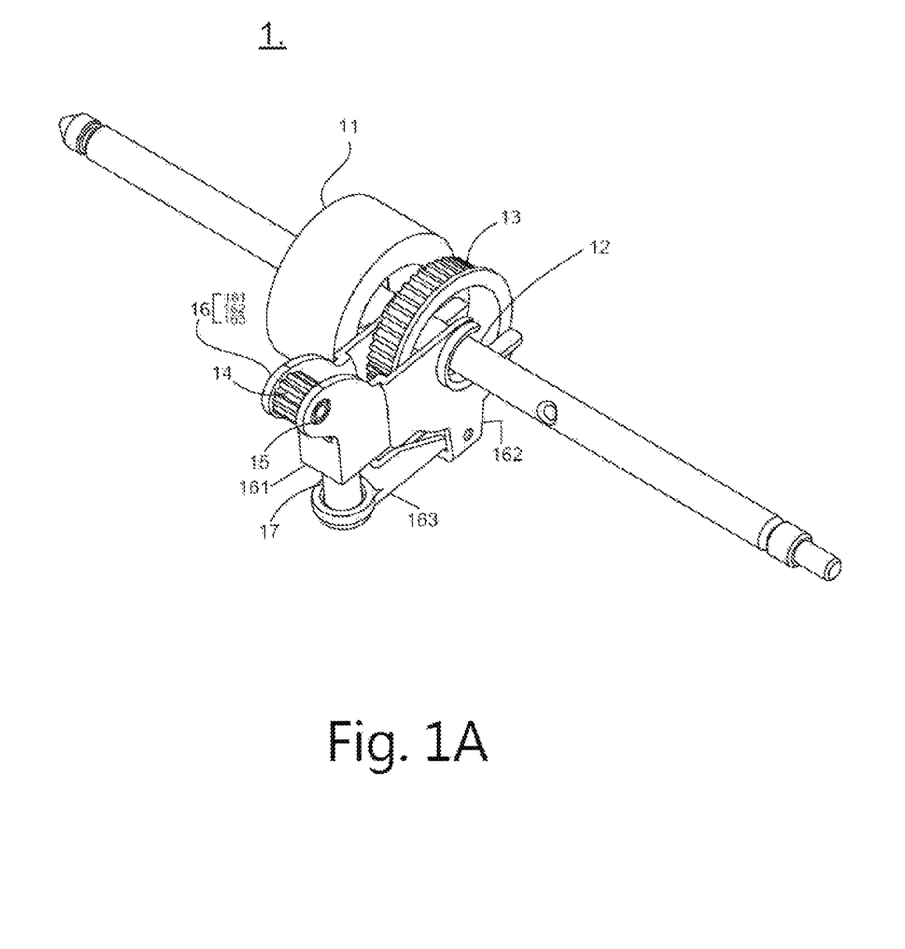
FIG. 1A is a schematic view illustrating a transmission assembly according to one embodiment of the present disclosure.
Figure 1B:
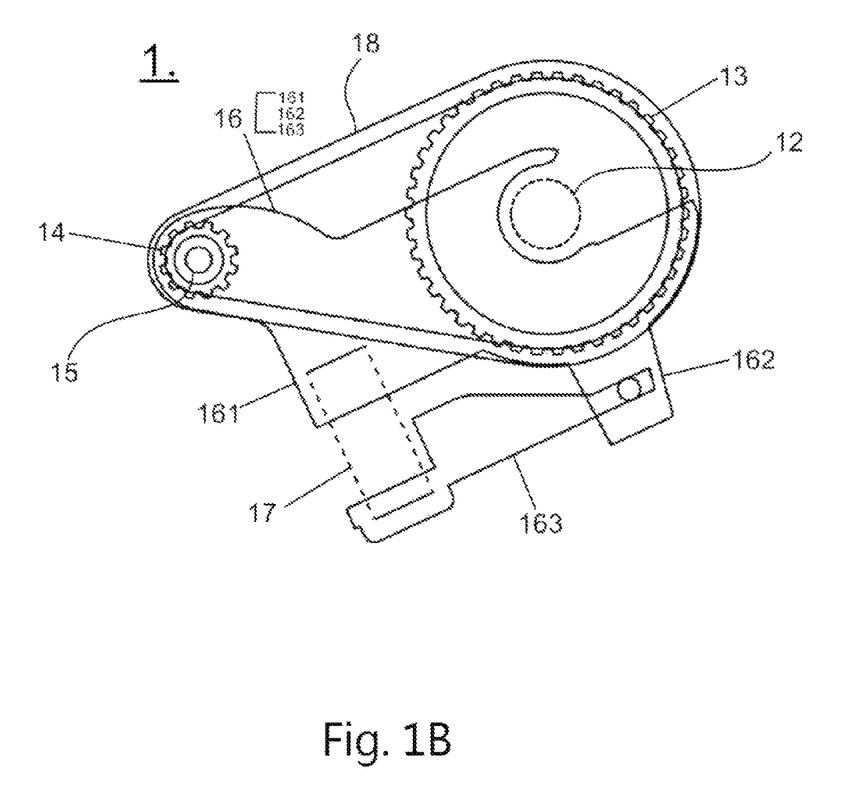
FIG. 1B is a side view illustrating the transmission assembly depicted in FIG. 1A.

FIG. 1A is a schematic view illustrating a transmission assembly according to one embodiment of the present disclosure. FIG. 1B is a side view illustrating the transmission assembly depicted in FIG. 1A. Referring to FIG. 1A and FIG. 1B, in the present disclosure, a transmission assembly 1 is provided. The transmission assembly is used for transferring a data carrier. The data carrier is, for example, paper, any document with information, or any type of card, which depends on practical applications and does not constrained in the present disclosure. In the present embodiment, the transmission assembly 1 includes a body 16, a first roller 13, a second roller 14, a flexible element 17, a third roller 11, and a transmission element 18. The first roller 13 is pivoted in a first position of the body 16. The second roller 14 is pivoted in a second position of the body 16. One end of the flexible element 17 is suitable for connecting to the body 16. In addition, the third roller 11 of the present embodiment is disposed in the transferring path.

In detail, the third roller 11 is, for example, pivoted aside the first roller 13 in parallel and rotates with the first roller 13 simultaneously. The transmission element 18 is connected to the first roller 13 and the second roller 14 along the transferring path. Further, the transmission element 18 is, for example, disposed between two third rollers 11. Wherein, the transmission element 18 can drive the data carrier to transfer along the transferring path. The sum of the radius of the first roller 13 and the thickness of the transmission element 18 is equal to the radius of the third roller 11 substantially. Besides, the rotating directions of the first roller 13, the second roller 14, the third roller 11 and the transmission element 18 are the same.

In the present embodiment, the body 16 is, for example, a supporting structure. The body 16 further includes a connecting portion 161. The connecting portion 161 is, for example, disposed under the second roller 14. The connecting portion 161 can be a bump or other suitable structure. Preferably, the flexible element 17 is located under the body 16 and connected to the connecting portion 161. Thus, when the transmission assembly 1 rotates, the flexible element 17 will be compressed, and then a upward counter force provided by the flexible element 17 is generated. Preferably, the connecting portion 161 is protruded out of the range surrounded by the transmission element 18, and the position of the connecting portion 161 in horizontal direction is located between the first roller 13 and the second roller 14. Wherein, the connecting portion 161 is set in the body 16, and the connecting mode can be a locking mode, a wedging mode, or a integrative mode. Referring to FIG. 1A, the protruding position of the connecting portion 161 is close to the second roller 14 and far from the first roller 13 in the vertical direction.

Preferably, the transmission element 18 is a driving chain with friction. The transmission element 18 is, for example, a belt, wherein a friction surface is disposed on one surface of the belt toward the data carrier. The transmission element 18 is used for connecting to the first roller 13 and the second roller 14, and causes the rotating directions of the first roller 13 and the second roller 14 the same. A first supporting frame 12 is disposed in the axes of the first roller 13, and the disposition of the first supporting frame 12 is also located in the first position of the body 16. A second supporting frame 15 is disposed in the axes of the second roller 14, and the disposition of the second supporting frame 15 is also located in the second position of the body 16. The design of the transmission element 18 is used for increasing the contacting area with the data carrier when the transmission assembly 1 rotates, wherein the data carrier can be a paper or a card. Thus, the contacting area between the data carrier and the transmission assembly 1 further includes one contacting portion between the data carrier and the transmission element 18 except the contacting portion between the data carrier and the third roller 11.

Preferably, the first roller 13 and the second roller 14 are not connected with each other, and the distance between the first supporting frame 12 and the second supporting frame 15 is longer than the diameter of the first roller 13. Further, the contacting length between the transmission element and the data carrier in the transferring path is longer than triple radius of the first roller. Therefore, the contacting area between the transmission assembly 1 and the data carrier transferred by the transmission element 18 can be increased.

Preferably, the flexible element 17 can be a spring or a rubber elastic body. Preferably, in the plane which vertical to the flexible element, the distance between the flexible element 17 and the second roller 14 is short than the distance between the connecting portion 161 and the first roller 13. Namely, the connecting location between the flexible element 17 and the connecting portion 161 is close to the second roller 14. The bottom of the body 162 is, for example, connected to the backplane 163 in the horizontal direction. The backplane 163 is used for supporting the flexible element 17, and a counter force is generated when the flexible element 17 is compressed between the backplane 163 and the connecting portion 161. Preferably, the connecting mode between the body 16 and the backplane 163 can be a locking mode, a wedging mode, a pivoting mode, a sliding connection, or a integrative mode.

Figure 1C:
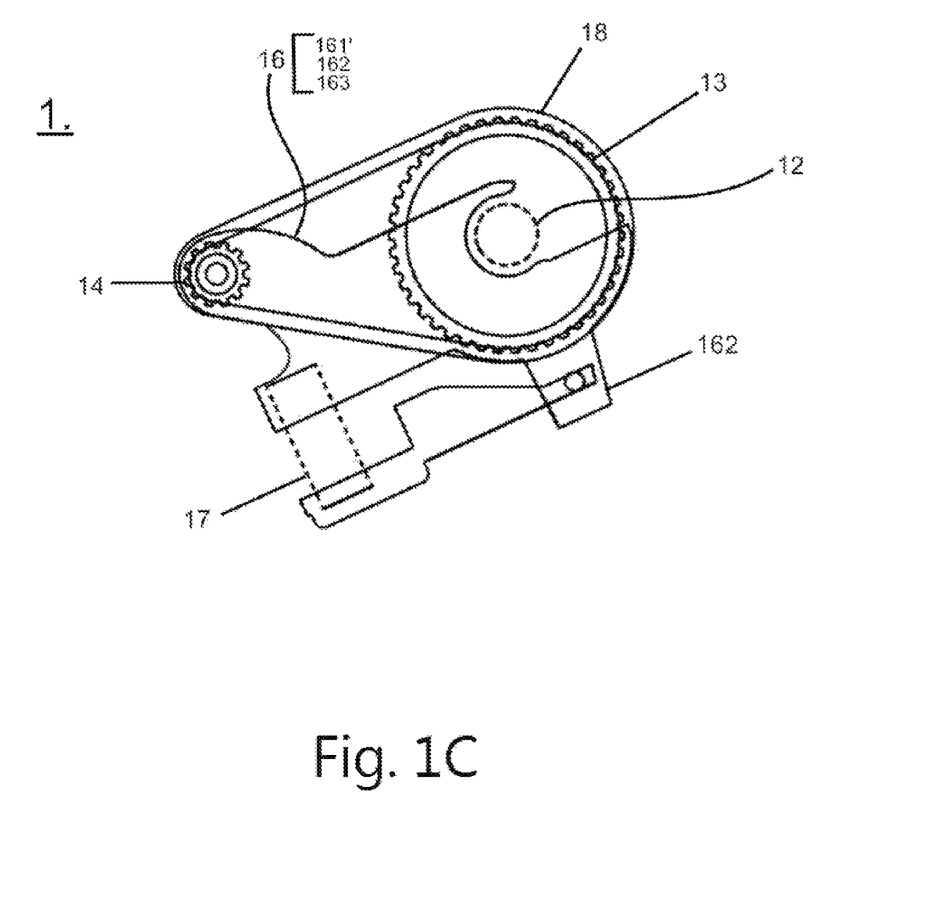
FIG. 1C is a schematic view illustrating a transmission assembly according to another embodiment of the present disclosure.

FIG. 1C is a schematic view illustrating a transmission assembly according to another embodiment of the present disclosure. The transmission assembly of the present embodiment is similar to the transmission assembly of the above embodiment. In the present embodiment, the body 16 of the present embodiment includes a connecting portion 161'. The flexible element 17 is located under the body 16, wherein connecting portion 161' is set in the body 16 and under the second roller 14. Wherein, the connecting portion 161' is protruded out of the range surrounded by transmission element 18, and one end of the connecting portion 161' is extended to the bottom of the second roller 14. The connecting mode between the connecting portion 161' and the body 16 can be a locking mode, a wedging mode, a pivoting mode, a sliding connection, or a integrative mode. Compared to the protruding portion of the connecting portion 161 shown in FIG. 1B, there is a recessed space formed in the portion of the connecting portion 161' near the second roller 14 in FIG. 1C.

In the above embodiment, the body 16 rotates along the pivoting axis of the first roller 13 and opposite to the backplane 163 to compress the flexible element 17. In addition, in one embodiment, the flexible element 17 can be compressed with a compressing length, and the compressing length is equal to the thickness of the data carrier substantially. Namely, the transmission assembly of the present embodiment can be adjusted timely according to the thickness of the data carrier, and ensures the transferring process of the data carrier smoothly.

Figure 2A:
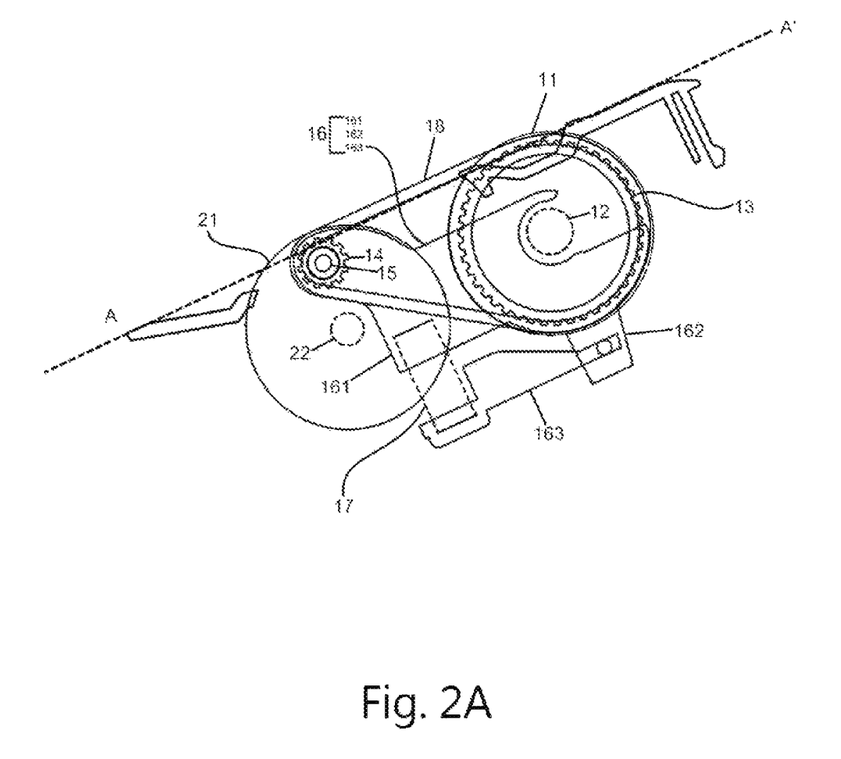
FIG. 2A is a schematic view illustrating the main components of a office machine being in one status according to one embodiment of the present disclosure.

FIG. 2A is a schematic view illustrating the main components of a office machine being in one status according to one embodiment of the present disclosure. In the present disclosure, a office machine is provided. The office machine includes a data carrier transferring channel AA' and a transmission assembly. The transmission assembly is disposed in the data carrier transferring channel AA', wherein the transmission assembly transfers the data carrier along a transferring path. Worth mention, in the present embodiment, the transmission assembly is regulated flexibly to adjust the height of the data carrier transferring channel according to the thickness of the data carrier. Thus, the data carrier can be transferred smoothly without trouble of the jams in the data carrier transferring channel resulted from the bad mechanism design. Further, the particulars described herein are not intended to limit the present disclosure, but rather, any design is considered within the spirit and scope of the present disclosure as long as the transmission assembly is regulated flexibly to adjust the height of the data carrier transferring channel according to the thickness of the data carrier.

From above, the transmission assembly of the present embodiment is, for example, the same as the above transmission assembly 1. Thus, in the present embodiment, the connecting relation between the transmission assembly and other main components and the corresponding labels are the same as the foregoing description. On the other hand, the office machine of the present embodiment further includes a fourth roller 21 and a friction element (not shown). The fourth roller 21 is, for example, disposed with the third roller 11, the first roller 13, and the second roller 14 in parallel which also disposed in the transferring path. In addition, the friction element (not shown) is disposed in the data carrier transferring channel AA', and also disposed opposite to the fourth roller 21. Wherein, the transmission element 18 can drive the data carrier to transfer along the transferring path. In actuation, the rotating directions of the first roller 13, the second roller 14, the fourth roller 21, and the transmission element 18 are the same. In FIG. 2A, the second roller 14 be in a initial status.

Preferably, the friction element (not shown) can be a friction sheet or a fifth roller, wherein the fifth roller can be a stationary roller or a reverse roller. Whether the friction element is the friction sheet or the fifth roller, just can provided a force opposite to the transferring direction of the data carrier.

Preferably, the outer walls of the third roller 11, the fourth roller 21, and the fifth roller (not shown) can be compressed elastically. Preferably, the transmission element 18 is disposed between two third rollers 13. Preferably, the second roller 14 pivoted in the body 16 is disposed between two fourth rollers 21. Wherein, the third roller 11 and the fourth roller 21 are not connected with each other.

Preferably, the axes of the second roller 14 and the axes of the fourth roller 21 are disposed in a vertical line together. The extension design of the transmission element 18 and the fourth roller 21 can provide a continuous friction to transfer the data carrier in a data carrier transferring channel AA', especially in the tangent plane of the fourth roller 21 contacted with the data carrier. Take the data carrier as a paper, the above design can avoid jams or paper stagnation. Take the data carrier as a card, the above design can avoid card stagnation. Wherein, the vertical line is, for example, vertical to the transferring path. In the embodiment, preferably, the diameter of the second roller 14 is short than or equal to the half diameter of the fourth roller 21, but the scope of the present disclosure is not intended to be limited to the particular embodiments. In addition, the contacting length between the transmission element 18 and the data carrier in the transferring path is, for example, longer than the sum of the diameter of the third roller 11 and the radius of fourth roller 21. The above design has a wide range of contacting area for driving the data carrier effectively and transferring the data carrier steady.

Take the paper transmission as a example, in other embodiments, the extension of the feeding friction provided by the transmission element 18 and the fourth roller 21 need to be consistent in the data carrier transferring channel AA'. For reaching the consistence of the transmission element 18 and the fourth roller 21, the transmission element 18 can act in the same level with the tangent plane of the fourth roller 21 contacted with the data carrier by the position of the second roller 14. Preferably, the portion of the transmission element which surrounds the second roller and contacted with the data carrier and the tangent plane of the fourth roller 21 contacted with the data carrier are located in the data carrier transferring channel AA'.

Preferably, the connecting location between the flexible element 17 and the body 16 is close to a third supporting frame 22 of the fourth roller 21. Preferably, in body 16, the flexible element 17 connected in connecting portion 161 and the second roller 15 are disposed opposite to third supporting frame 22.

Figure 2B:
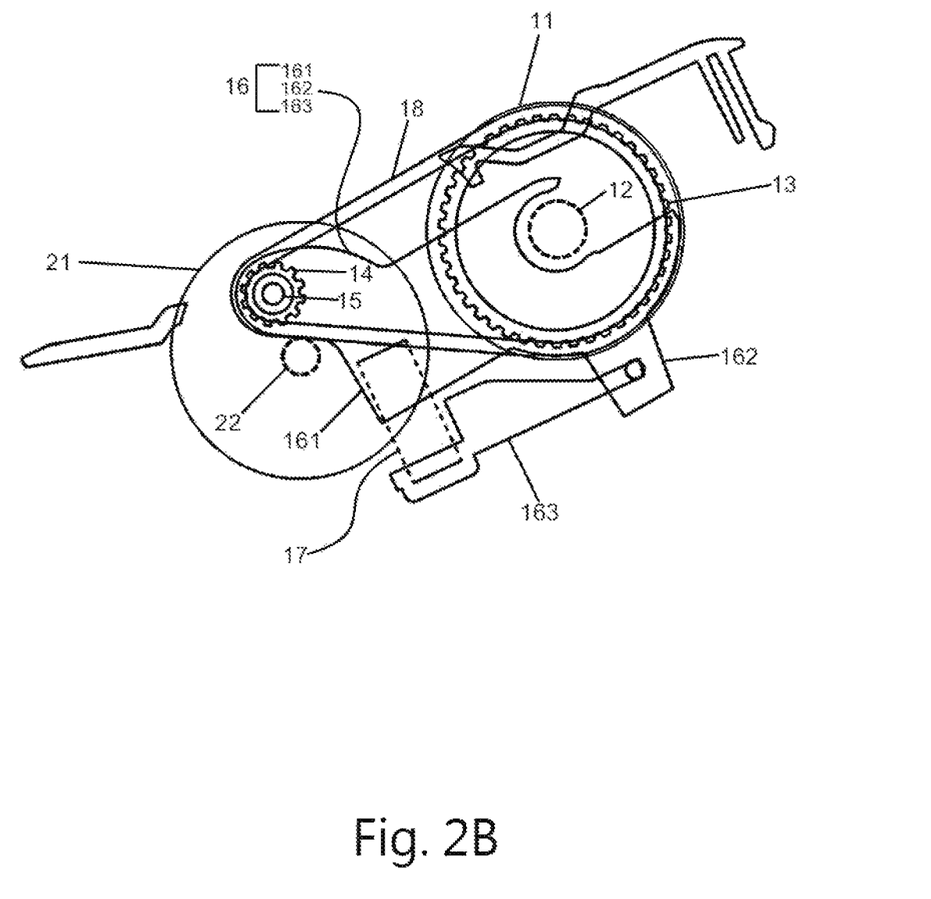
FIG. 2B is a schematic view illustrating the main components of the office machine depicted in FIG. 2A being in another status.

FIG. 2B is a schematic view illustrating the main components of the office machine depicted in FIG. 2A being in another status. In FIG. 2B, the second roller 14 is in a actuated status. In the present embodiment, the fourth roller 21 and the friction element (not shown) rotate and contact with each other. Thus, when a card or a credential with a certain thickness transfers in the data carrier transferring channel, the outer walls of the fourth roller 21 and the friction element (not shown) can be compressed elastically. Simultaneously, the second roller 14 also be pressed relatively. This results the flexible element 17 being compressed, and then a upward counter force provided by the flexible element 17 is generated. When the friction element (not shown) is the fifth roller, the fourth roller 21 and the fifth roller (not shown) are contacted with each other, and the outer walls of the fourth roller 21 and the fifth roller (not shown) can be compressed elastically. Simultaneously, the second roller 14 will be pressed relatively. This results the flexible element 17 being compressed, and then a upward counter force provided by the flexible element 17 is generated. Therefore, a card or a credential with a certain thickness can transfer in the data carrier transferring channel sequentially.

Figure 3:
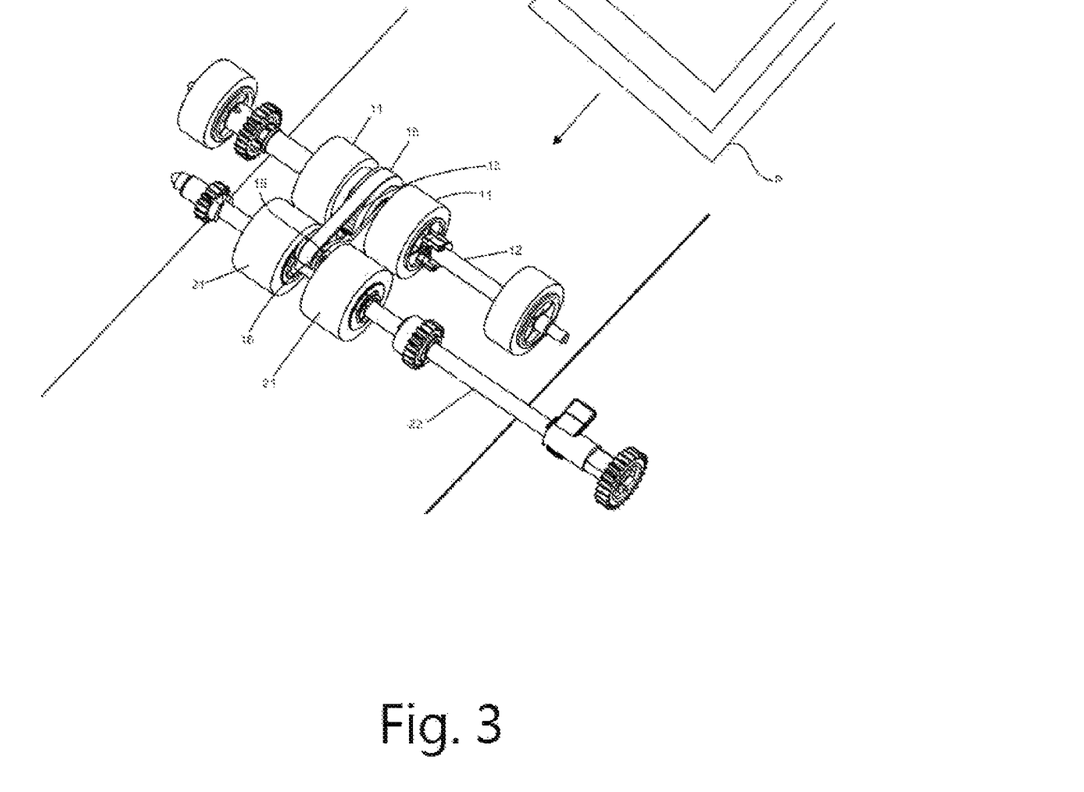
FIG. 3 is a schematic view illustrating a data carrier being transferred in a data carrier transferring channel of the present disclosure.

FIG. 3 is a schematic view illustrating a data carrier being transferred in a data carrier transferring channel of the present disclosure. FIG. 3 shows a paper P, a card (not shown), or a credential (not shown) be feed into the data carrier transferring channel AA' along a direction from the third roller 11 to the fourth roller 21. The fifth roller (not shown) is disposed above the data carrier transferring channel AA' opposite to fourth roller 21, and the fourth roller 21 is contacted to the fifth roller directly. The fifth roller (not shown) can be a stationary roller which does not rotate, or be a reverse roller having the same rotating direction with the fourth roller 21. This makes these overlapping papers P, cards, or credentials separate which be transferred non-simultaneously.

Preferably, in the drive of the office machine (not shown), due to the first supporting frame 12 is connected to the first roller 13 and the third roller 11, the first supporting frame 12 can drive the first roller 13 and the third roller 11 rotate. When the first roller 13 rotates, the second roller 14 and the transmission element 18 rotate simultaneously. Identically, the drive of the office machine (not shown) also can act by the second supporting frame 22. Due to the second supporting frame 22 is connected to the fourth roller 21. Thus the second supporting frame 22 can drive the fourth roller 21 rotate. When the third roller 11 and the fourth roller 21 be drive, the tangential velocity of the third roller 11 is not more than the tangential velocity of the fourth roller 21. This is, the tangential velocity of the third roller 11 is less than or equal to the tangential velocity of the fourth roller 21. The diameter of the third roller 11 is the same as the diameter of the fourth roller 21. Preferably, the angular velocity of the third roller 11 is 20%~100% angular velocity of the fourth roller 21. Preferably, the angular velocity of the third roller 11 is 40%~80% angular velocity of fourth roller 21.

In the present disclosure, the transmission element is designed to surround the first roller and the second roller for generating a spread of driving power to transfer the data carrier except the driving power of the third roller. In addition, the design of the disposition of the second roller disposed above the axes of the fourth roller causes the driving power between the transmission element and the fourth roller synchronously, and minimizing the driving interruption. In addition, in the present disclosure, a counter force is generated by the design of the flexible element disposed in the body when the second roller is pressed by a card or a credential with a certain thickness. Except the upward force toward the above card or credential, the driving force for the data carrier provided by the transmission element also makes the feeding process more smoothly.

Besides, the contacting length between the above transmission element and the data carrier in the transferring path is longer than triple radius of the first roller, the above design can provides a extension of the friction for the transmission of the data carrier. In addition, in the present disclosure, the transmission of the data carrier can be drive by the action of the first roller, the second roller, and the transmission element mainly. On the other hand, the transmission of the data carrier can be drive by other components suitably, the particulars described herein are not intended to limit the present disclosure.

While the disclosure has been described by way of example and in terms of the preferred embodiments, it is to be understood that the disclosure is not limited to the disclosed embodiments. To the contrary, it is intended to cover various modifications and the same arrangements (as would be apparent to those skilled in the art). Therefore, the scope of the appended claims should be accorded the broadest interpretation so as to encompass all such modifications and the same arrangements.

What is claimed is:

1. A transmission assembly, transferring a data carrier along a transferring path, the transmission assembly comprising:
   a body;
   a first roller, pivoted in a first position of the body;
   a second roller, pivoted in a second position of the body;
   a third roller, disposed in the transferring path;
   a flexible element, one end of the flexible element is suitable for connecting to the body; and
   a transmission element, connected to the first roller and the second roller along the transferring path;
   wherein, the transmission element drives the data carrier to transfer along the transferring path, and the rotating directions of the first roller, the second roller, the third roller, and the transmission element are the same;
   wherein, the flexible element is a elastic body;
   wherein, when the data carrier is transferred along a transferring path, the second roller is pressed by the data carrier, and then the body pivoted with the second roller is driven to rotate by the data carrier for compressing the flexible element;
   wherein, the flexible element is compressed with a compressing length, the distance of the compressing length is equal to the thickness of the data carrier substantially;
   wherein, the flexible element is compressed by the body without contacting the data carrier;
   wherein, the third roller is pivoted aside the first roller in parallel and rotates with the first roller simultaneously, and the transmission element is disposed aside the third roller.

2. The transmission assembly of claim 1, wherein the body is a supporting structure, which further comprising a connecting portion disposed under the second roller, the flexible element is located under the body and connected to the connecting portion.

3. The transmission assembly of claim 1, wherein the transmission element is a belt, a friction surface is disposed on one surface of the belt toward the data carrier, and the transmission element causes the rotating directions of the first roller and the second roller the same.

4. The transmission assembly of claim 1, wherein a first supporting frame and a second supporting frame are disposed in the first position and the second position of the body respectively, the first supporting frame is disposed in axes of the first roller, the second supporting frame is disposed in axes of the second roller.

5. The transmission assembly of claim 1, wherein the first roller and the second roller are not connected with each other, and the sum of radius of the first roller and thickness of the transmission element are equal to radius of the third roller substantially.

6. The transmission assembly of claim 1, wherein the contacting length between the transmission element and the data carrier in the transferring path is longer than triple radius of the first roller.

7. A office machine, comprising:
   a data carrier transferring channel; and
   a transmission assembly, disposed in the data carrier transferring channel and transfers a data carrier along a transferring path, the transmission assembly being regulated elastically to adjust the height of the data carrier transferring channel according to the thickness of the data carrier,
   wherein the transmission assembly comprising:
   a body;
   a first roller, pivoted in a first position of the body;
   a second roller, pivoted in a second position of the body;
   a flexible element, one end of the flexible element is suitable for connecting to the body;
   a transmission element, connected to the first roller and the second roller along the transferring path;
   a third roller, disposed in the transferring path; and
   a fourth roller, disposed in the transferring path;
   wherein, the transmission element drives the data carrier to transfer along the transferring path, and the rotating directions of the first roller, the second roller, the third roller, the fourth roller, and the transmission element are the same;
   wherein, the flexible element is a elastic body;
   wherein, when the data carrier is transferred along a transferring path, the second roller is pressed by the data carrier, and then the body pivoted with the second roller is driven to rotate by the data carrier for compressing the flexible element;
   wherein, the flexible element is compressed with a compressing length, the distance of the compressing length is equal to the thickness of the data carrier substantially;
   wherein, the flexible element is compressed by the body without contacting the data carrier;
   wherein, the outer walls of the third roller and the fourth roller can be compressed elastically;

wherein, the third roller is disposed aside the first roller in parallel and rotates with the first roller simultaneously, and the transmission element is disposed aside the third roller, the second roller is disposed aside the fourth roller.

8. The office machine of claim 7, wherein the axes of the second roller and the axes of the fourth roller are disposed in a vertical line together.

9. The office machine of claim 7, wherein the contacting length between the transmission element and the data carrier in the transferring path is longer than triple radius of the first roller or the sum of the diameter of the third roller and the radius of the fourth roller.

* * * * *